United States Patent [19]

Moriyama et al.

[11] Patent Number: 5,310,788

[45] Date of Patent: * May 10, 1994

[54] SAPONIFIED ETHYLENE-VINYL ACETATE COPOLYMER COMPOSITION AND THE USE THEREOF

[75] Inventors: Takamasa Moriyama, Suita; Hiroshi Takida, Takatsuki; Tomoyoshi Uemura, Ibaraki, all of Japan

[73] Assignee: Nippon Gohsei Kagaku Kogyo Kabushiki Kaisha, Osaka, Japan

[*] Notice: The portion of the term of this patent subsequent to Apr. 29, 2009 has been disclaimed.

[21] Appl. No.: 876,701

[22] Filed: Apr. 29, 1992

Related U.S. Application Data

[63] Continuation of Ser. No. 648,801, Jan. 31, 1991, abandoned.

[30] Foreign Application Priority Data

Feb. 1, 1990 [JP] Japan ............................... 2-23015
Oct. 29, 1990 [JP] Japan ............................... 2-293070

[51] Int. Cl.⁵ ........................ C08L 23/08; C08L 33/04
[52] U.S. Cl. .................................... 525/57; 525/240; 525/78; 525/70; 525/420
[58] Field of Search ............... 525/57, 70, 78, 240, 525/420

[56] References Cited

U.S. PATENT DOCUMENTS

| | | | |
|---|---|---|---|
| 3,375,300 | 3/1968 | Ropp | 260/857 |
| 3,975,463 | 8/1986 | Hirata et al. | 260/897 |
| 4,058,647 | 11/1977 | Inoue et al. | 428/474 |
| 4,261,473 | 4/1981 | Yamada et al. | 215/1 |
| 4,370,388 | 1/1983 | Mito et al. | 428/461 |
| 4,387,188 | 6/1983 | Statz | 524/430 |
| 4,472,555 | 9/1984 | Schmulker et al. | 525/74 |
| 4,594,386 | 6/1986 | Olivier | 525/66 |
| 4,600,746 | 7/1986 | Schmulker et al. | 525/57 |
| 4,613,644 | 9/1986 | Moritani | 524/430 |
| 4,675,356 | 6/1987 | Miyata | 524/395 |
| 4,704,423 | 11/1987 | Iwanami et al. | 524/417 |
| 4,758,477 | 7/1988 | Okano et al. | 428/475.2 |
| 4,795,781 | 4/1989 | Miyamoto et al. | 525/58 |
| 4,864,002 | 9/1989 | Scheutz et al. | 525/204 |
| 4,904,723 | 2/1990 | Uemura et al. | 524/394 |
| 4,910,254 | 3/1990 | Johnston | 525/75 |
| 4,962,148 | 10/1990 | Orikasa et al. | 524/504 |
| 4,963,608 | 10/1990 | Kunieda et al. | 524/394 |

FOREIGN PATENT DOCUMENTS

31708/89 9/1989 Australia.
0342066 11/1989 European Pat. Off..
1284524 11/1989 Japan.

*Primary Examiner*—James J. Seidleck
*Assistant Examiner*—W. R. H. Clark
*Attorney, Agent, or Firm*—Armstrong, Westerman, Hattori, McLeland & Naughton

[57] ABSTRACT

An improved saponified ethylene-vinyl acetate copolymer composition comprising (A) 50 to 99.5 weight % of a saponified ethylene-vinyl acetate copolymer, (B) 0.4 to 50 weight % of an ethylene copolymer having a density of 0.90~0.94 g/cm³, and (C) a graft polymer obtainable by grafting an ethylenically unsaturated carboxylic acid or a derivative thereof to a polyolefin resin and reacting the adduct with a polyamide oligomer or polyamide.

3 Claims, No Drawings

SAPONIFIED ETHYLENE-VINYL ACETATE COPOLYMER COMPOSITION AND THE USE THEREOF

This application is a continuation of application Ser. No. 648,801 filed Jan. 31, 1991, now abandoned.

BACKGROUND OF THE INVENTION

1. Industrial Field of Utilization

The present invention provides a saponified ethylene-vinyl acetate copolymer composition insuring improved oxygen barrier property and markedly improved physical properties, for example stretchability, film-forming property and other moldability and flexibility.

2. Prior Art

Saponified ethylene-vinyl acetate copolymers in general are excellent in various properties such as oxygen barrier property, mechanical strength, etc. and, as such, have found application in many uses such as film, sheet, container material, textile fiber and so on. However, this saponified copolymer gives rise to a variation in product thickness in the molding process for manufacture of film or sheet, with the consequent decrease in the marketability of the product, and because of the deficiency in stretchability and flexibility, gives rise to uneven stretching in deep-drawing and other processes involving a stretching force or pinholes in use of the product, thus imposing serious limitations on its application as a packaging raw material.

To cope with these drawbacks, it has been attempted to laminate a water-proof resin material such as a polyolefin film to a saponified ethylene-vinyl acetate copolymer sheet or improve stretchability and flexibility of the molding by incorporating a polyolefin in the saponified copolymer.

3. Problems that are to be Solved

However, the former method requires a laminating procedure as an essential step and the latter method does not overcome the drawbacks radically, either. Thus, the compatibility between the saponified ethylene-vinyl acetate copolymer and said polyolefin is not necessarily good enough and despite many efforts to overcome this disadvantage, the results are not as satisfactory as desired. Thus, the prior art technologies are not successful enough to improve the uniformity of film thickness, stretchability and flexibility of the saponified ethylene-vinyl acetate copolymer while upholding its inherent characteristics.

SUMMARY OF THE INVENTION

The intensive research undertaken by the inventors of the present invention revealed that the above-mentioned objects are accomplished by a saponified ethylene-vinyl acetate copolymer composition which comprises (A) 50 to 99.5 weight % of a saponified ethylene-vinyl acetate copolymer,
(B) 0.4 to 50 weight % of an ethylene copolymer having a density of 0.90~0.94 g/cm$^3$, and
(C) a graft polymer obtainable by grafting an ethylenically unsaturated carboxylic acid or a derivative thereof to a polyolefin resin and reacting the adduct with a polyamide oligomer or polyamide.

DETAILED DESCRIPTION OF THE INVENTION

The present invention will hereinafter be described in detail, with emphasis placed on the above composition and particularly on uses therefor.

The saponified ethylene-vinyl acetate copolymer (A) to be employed in accordance with the present invention is a copolymer with an ethylene content of 20 to 60 mole %, preferably 25 to 55 mole %, with a degree of saponification of its vinyl acetate component being not less than 95 mole %.

With an ethylene content less than 20 mole %, the oxygen barrier property under high-humidity conditions is not as high as desired, while an ethylene content in excess of 60 mole % leads to decreases in oxygen barrier property, printability and other physical properties. When the degree of saponification or hydrolysis is less than 95 mole %, the oxygen barrier property and moisture resistance are sacrificed. Among such saponified copolymers, those having melt flow rates in the range of 0.5 to 100 g/10 minutes are particularly useful.

It should be understood that this saponified copolymer may contain small proportions of other comonomer ingredients including α-olefins such as propylene, isobutene, α-octene, α-dodecene, α-octadecene, etc., unsaturated carboxylic acids or salts thereof, partial alkyl esters, complete alkyl esters, nitriles, amides and anhydrides of said acids, and unsaturated sulfonic acids or salts thereof.

The ethylene copolymer (B) is any of commercially readily available copolymers such as low-density polyethylene, linear low-density polyethylene, ethylene-vinyl acetate copolymer, ethylene-acrylic ester copolymer and so on.

Any of these copolymers must have a density of 0.90~0.94 g/cm$^3$ (JIS K-6760). With medium-density polyethylene or high-density polyethylene, the effects of the invention cannot be easily obtained.

Among these copolymers (B), those having melt flow rates (190° C., load 60 g; the same applies hereinafter) in the range of about 0.3 to 30 g/10 minutes are preferably employed.

For improving the compatibility between (A) and (B), incorporation of (C) is essential in the practice of the invention.

The component (C) is a graft polymer obtainable by grafting an ethylenically unsaturated carboxylic acid or a derivative thereof to a polyolefin resin and reacting this carboxylic acid or derivative thereof with a polyamide oligomer or polyamide.

This graft polymer can be produced by dissolving or suspending a polyolefin resin in an appropriate solvent or putting it in a molten state, activating the polyolefin resin chain with a peroxide or diazo initiator, grafting an ethylenically unsaturated carboxylic acid or a derivative thereof thereto to give a polymer and mixing this polymer with a polyamide oligomer or polyamide in molten state.

For this reaction, Brabender machine, Buss blender, single-screw extruder, Werner and Pfleiderer twin-screw extruder or the like is employed.

The degree of polymerization of the polyolefin resin to be employed is about 350 to 45,000 and preferably about 500 to 10,000. The melt flow rate (230° C., load 2160 g; the same applies hereinafter) is about 0.1 to 50 g/10 minutes for all practical purposes.

The reaction ratio of the polyolefin resin to the ethylenically unsaturated carboxylic acid or a derivative thereof is 100/0.05 through 100/10 and preferably 100/0.5 through 100/3 as expressed on the weight basis.

If the ratio is 100/less than 0.05, the improving effect on compatibility will not be sufficient. On the other hand, if the ratio is 100/more than 10, the viscosity will be too high for practical molding.

The degree of polymerization of said polyamide oligomer is 5 to 80, preferably not less than 15, and the degree of polymerization of said polyamide is 80 to 1000, preferably not more than 500, for all practical purposes and the reaction ratio is 0.01 to 1 mole and preferably 0.05 to 0.0 mole per mole of the carboxyl group.

As examples of the polyolefin resin, there may be mentioned linear low-density, low-density or high-density polyethylene, ionomers, ethylene-propylene copolymer, ethylene-vinyl acetate copolymer, ethylene-acrylic ester copolymer and so on. Important for practical purposes are linear low-density polyethylene, low-density polyethylene, ethylene-propylene copolymer and ethylene-vinyl acetate copolymer.

The ethylenically unsaturated carboxylic acid or derivative thereof to be grafted to such a trunk polymer includes, among others, unsaturated carboxylic acids such as acrylic acid, methacrylic acid, crotonic acid, maleic acid, fumaric acid and itaconic acid and the corresponding anhydrides or half esters.

The polyamide oligomer or polyamide can be prepared by the known methods such as addition polymerization of a lactam, polycondensation of an aminocarboxylic acid, polycondensation of a diamine with a dicarboxylic acid, and so on.

Examples of the starting materials for said polyamide oligomer or polyamide are various lactams such as $\epsilon$-caprolactam, enantholactam, caprylolactam, laurolactam, $\alpha$-pyrrolidone, $\alpha$-piperidone, etc., $\omega$-amino acids such as 6-aminocaproic acid, 7-aminoheptanoic acid, 9-aminononanoic acid, 11-aminoundecanoic acid, etc., dibasic acids such as adipic acid, glutaric acid, pimellic acid, subcric acid, azelaic acid, sebacic acid, undecadioic acid, dodecadioic acid, hexadecadioic acid, hexadecenedioic acid, eicosadioic acid, eicosadienedioic acid, diglycolic acid, 2,2,4-trimethyladipic acid, xylylenedicarboxylic acid, 1,4-cyclohexanedicarboxylic acid, terephthalic acid, isophthalic acid, etc., and diamines such as hexamethylenediamine, tetramethylenediamine, nonamethylenediamine, undecamethylenediamine, dodecamethylenediamine, 2,2,4- (or 2,4,4-)trimethylhexamethylenediamine, bis(4,4'-aminocyclohexyl)methane, metaxylylenediamine and so on. For molecular weight control, a monoamine such as laurylamine or oleylamine can also be used in an appropriate amount.

In the composition of the present invention, the proportion of (A) should be 50 to 99.5 weight % and preferably 60 to 95 weight %, that of (B) should be 0.4 to 50 weight % and preferably 4.5 to 35 weight %, and that of (C) should be 0.1 to 15 weight % and preferably 0.5 to 10 weight %.

When the proportion of (A) is less than 50 weight or that of (B) is over 50 weight %, the oxygen barrier property is adversely affected. Conversely when the proportion of (A) is over 99.5 weight % or that of (B) is less than 0.4 weight %, stretchability and flexibility are sacrificed and uneven film thickness tends to occur. When the proportion of (C) is less than 0.1 weight %, the compatibility between (A) and (B) is poor, and the effect of the invention is hardly implemented. Conversely when the proportion of (C) exceeds 15 weight %, long-run moldability is adversely affected.

While the composition according to the present invention is useful for a variety of applications such as shaped articles, adhesives, coatings and so on, it is most useful for molding purposes and can be molded into pellets, film, sheet, containers, fibers, bars, pipe and other shaped articles by the melt-kneading technique. Such products can be crushed (for reclaiming) or pelleted for re-melt-molding.

For melt-molding of the composition, extrusion molding (e.g. T-die extrusion, inflation molding, blow molding, melt spinning or contour extrusion) and injection molding are mostly employed. The melt-molding temperature is selected in many cases from the range of 170° to 270° C. In addition to the above techniques, two-color molding and injection-blow molding techniques may also be employed and shaped articles with good dimensional tolerances can be manufactured.

In the molding process, it is of course possible to use two or more different saponified ethylene-vinyl acetate copolymers varying in ethylene content and/or in the degree of saponification in combination. In melt-molding, it is also possible to incorporate suitable amounts of additives such as a plasticizer (for example, a polyhydric alcohol), stabilizer, surfactant, crosslinking agent (for example, an epoxy compound, polyvalent metal salt, inorganic or organic polybasic acid or salt thereof), filler, colorant, reinforcing fiber (for example, glass fiber, carbon fiber, etc.), hydrotalcite and so on. It is also possible to incorporate various other thermoplastic resins in a suitable proportion. Such thermoplastic resin includes, among others, various polyolefins other than (B), modified polyolefins obtainable by graft-modification of such polyolefins with unsaturated carboxylic acids or derivatives thereof, polyamides, polyvinyl chloride, polyvinylidene chloride, polyesters, polystyrene, polyacrylonitrile, polyurethanes, polyacetal, polycarbonates, melt-moldable polyvinyl alcohol resin and so on.

As mentioned hereinbefore, the composition of the present invention is not only used for the manufacture of a single-layer article solely composed of the composition but also used often as a laminated article including at least one layer of the composition.

In the manufacture of a laminated product according to the invention, in which a different material is laminated to one side or either side of a layer of the composition of the invention, the following laminating methods, for instance, can be employed. Thus, the method which comprises melt-extruding a thermoplastic resin onto a film or sheet of the composition of the invention, the method which comprises melt-extruding the composition of the invention onto a substrate made of a thermoplastic resin or some other material, the method which comprises co-extruding the composition of the invention and a different thermoplastic resin, and the method in which a film or sheet of the composition of the invention is laminated to a film or sheet of a different material with a known adhesive such as an organotitanium compound, an isocyanate compound or a polyester compound can be mentioned.

As mating resins for co-extrusion, there may be mentioned linear low-density polyethylene, low-density polyethylene, medium-density polyethylene, high-density polyethylene, ethylene-vinyl acetate copolymer, ionomers, ethylene-propylene copolymers, ethylene-acrylic ester copolymers, polypropylene, propylene-α-olefin ($C_{4-20}$ α-olefin) copolymers, homo- or copolymers of olefins such as polybutene, polypentene, etc., and polyolefin resins in a broad sense as obtainable by modifying such homopolymers or copolymers of olefins by grafting of an unsaturated carboxylic acid or an ester thereof, polyesters, polyamides, copolymerized polyamides, polyvinyl chloride, polyvinylidene chloride, acrylic resins, styrenic resins, vinyl ester resin, polyester elastomers, polyurethane elastomers, chlorinated polyethylene, chlorinated polypropylene and so on. A saponified ethylene-vinyl acetate copolymer can also be co-extruded.

When a film or sheet or the like shaped article is prepared from the composition of the invention and, then, extrusion-coated with a different material or laminated to a film or sheet of a different material with an adhesive, said different material is not limited to said thermoplastic resins but may be virtually any other material (such as paper, metal foil, uniaxially or biaxially oriented plastic film or sheet, woven fabric, nonwoven fabric, metal filament, wood and so on).

The laminar structure of said laminated product is optional. Thus, a layer of the composition of the invention being designated as A ($A_1$, $A_2$, ...) and a layer of a different material, e.g. a thermoplastic resin, being designated as B ($B_1$, $B_2$, ...), not only a two-layer structure of A/B but a variety of other combinations such as B/A/B, A/B/A, $A_1/A_2/B$, $A/B_1/B_2$, B/A/B, $B_2/B_1/A/B_1/B_2$, etc. can be employed for a film, sheet or bottle, for instance. In the case of a filament, a bimetal-type, core (A)—sheath (B), core (B)—sheath (A), eccentric core-sheath and other combinations of A and B can be adopted.

For co-extrusion, A may be blended with B or vice versa, or for improved interlayer adhesion, a suitable resin may be incorporated in at least one of A and B.

The laminated product may be optionally configured. Thus, film, sheet, tape, bottle, pipe, filament, or modified cross-section extrudate may be mentioned.

The laminated product may, if necessary, be further subjected to a variety of processings, such as heat treatment, cooling, rolling, printing, dry lamination, solution- or melt-coating, bag production, deep-drawing, box-making, tubing, splitting and so on.

The aforementioned shaped articles and laminated products can be improved in physical properties by stretching or drafting, if required.

In the present invention, the composition is melt-molded into a film material. The thickness of such film is virtually optional and may range from a few microns to several hundred microns. The term 'film' as used in this specification means a film in the broad sense of the term, thus including a sheet, tape, tube, container and so on.

Since these films are uniform in thickness, their marketability is high. Moreover, this stability of film thickness is preserved even after a long series of molding and processing steps.

The film obtained in the above manner is conditioned for absorption of moisture or drying, if necessary, and then stretched.

This stretching may be uniaxial or biaxial. The effects of the invention are better materialized when the stretching ratio or draft is as high as possible. In the case of uniaxial stretching, the stretching ratio is preferably at least 1.5 times and, for still better results, not less than 2 times. In the case of biaxial stretching, the stretching ratio is preferably not less than 1.5 times, more desirably not less than 2 times and, for still better results, not less than 4 times on the area basis.

The present invention is characterized in that a high draft ratio of not less than 5, particularly in excess of 7, is assured.

As to the stretching technique that can be employed, there may be mentioned roll stretching, tenter stretching, tubular stretching and stretching blow processes, as well as high-draft deep drawing or vacuum molding. In the case of biaxial stretching, whichever of concurrent biaxial stretching and serial biaxial stretching can be adopted.

The stretching temperature is selected from the range of about 40° to 150° C.

After completion of stretching, the product is thermally set. This thermal setting can be effected by the well-known technique. Thus, with the stretched film being held in taut condition, it is heat-treated at a temperature of 50° to 160° C., preferably at 80° to 160° C. for about 2 to 600 seconds.

The resulting oriented film can be subjected to a variety of processings such as cooling, rolling, printing, dry lamination, solution- or melt-coating, bag-making, deep-drawing, box-making, tubing, splitting and so on.

The film, sheet or container obtainable from the composition of the present invention is useful for packaging foodstuffs, pharmaceutical products, industrial chemicals, agrichemical products and so on.

Effects

In accordance with the present invention, the composition of a saponified ethylene-vinyl acetate copolymer (A) and an ethylene copolymer with a defined density (B) is used in combination with a specified graft polymer (C), with the result that the compatibility of (A) and (B) is markedly improved and the shaped article obtainable from the composition shows excellent oxygen barrier property and marked improvements in stretchability, film thickness and flexibility which are deficient in (A).

EXAMPLES

The following examples are further illustrative of the composition of the present invention. In the following description, all parts and % are by weight unless otherwise indicated.

| Preparation of the samples Saponified ethylene-vinyl acetate copolymer | | | | |
|---|---|---|---|---|
| Sample | E-1 | E-2 | E-3 | E-4 |
| Ethylene content (mole %) | 30 | 33 | 40 | 45 |
| Degree of saponification of vinyl acetate component (mole %) | 99.4 | 99.1 | 99.6 | 99.7 |
| Melt flow rate (g/10 min.) | 3.8 | 5.5 | 7.2 | 12.5 |

| | Ethylene copolymer | |
|---|---|---|
| Sample | Density (g/cm$^3$) | Melt flow rate (g/10 min.) |
| P-1 Low density polyethylene | 0.924 | 6 |
| P-2 Linear low-density polyethylene | 0.920 | 2.1 |

-continued

| Sample | Ethylene copolymer | |
|---|---|---|
|  | Density (g/cm³) | Melt flow rate (g/10 min.) |
| P-3 Ethylene-vinyl acetate (15%) | 0.934 | 14 |

| Sample | Graft polymer | | | |
|---|---|---|---|---|
|  | G-1 | G-2 | G-3 | G-4 |
| Trunk polymer (a) MFR (g/10 min.) | Linear low-density polyethylene (12.5) | Linear low-density polyethylene (7.8) | Ethylene-vinyl acetate(12%) copolymer (4.5) | Ethylene(12%)-propylene copolymer (8.0) |
| Unsaturated carboxylic acid (b) | Maleic anhydride | Maleic anhydride | Maleic anhydride | Maleic anhydride |
| Polyamide oligomer (c) | ε-Caprolactam oligomer ($\overline{P}$: 25) | ε-Caprolactam oligomer ($\overline{P}$: 40) | Hexamethylene-diamine/adipic acid oligomer ($\overline{P}$: 24) | ε-Caprolactam oligomer ($\overline{P}$: 24) |
| Composition ratio |  |  |  |  |
| (a)/(b) (weight ratio) | 100/2.1 | 100/2.5 | 100/1.8 | 100/2.9 |
| (c)/(b) (mole ratio) | 1/2 | 2/2.5 | 1.4/1.8 | 0.9/2.9 |

EXAMPLES 1 THROUGH 8 AND Control Examples 1 through 6

Pellets of the composition of (A), (B) and (C) were mixed in a Henschel mixer and fed to a T-die extrusion machine for melt-kneading and extrusion from the T-die to produce a 30 μ-thick film. (In the evaluation of stretchability, a 180 μ-thick film was used.)

The extrusion molding conditions were as follows.
Extruder: 40 mm-dia. extruder
Screw Dulmage head type, L/D = 28, CR = 3
Extrusion temperature : 230° C.
RPM of screw: 40 rpm The data on the film are presented in Table 1.

TABLE 1

| Example | Material | Blending ratio E/P/G | Physical properties | | | | |
|---|---|---|---|---|---|---|---|
|  |  |  | Oxygen permeability (cc · 20 μ/m² · day · atm) 25° C. × 75% RH | Stretchability | | Impact strength (kg · cm/mm) | Film thickness stability |
|  |  |  |  | 5 × 5 | 7 × 7 |  |  |
| 1 | E-1 P-1 G-1 | 70/25/5 | 1.0 | ⊙ | ○ | 95 | ⊙ |
| 2 | E-2 P-2 G-2 | 75/15/10 | 1.1 | ⊙ | ⊙ | 115 | ⊙ |
| 3 | E-3 P-3 G-3 | 85/10/5 | 1.7 | ⊙ | ○ | 140 | ⊙ |
| 4 | E-4 P-1 G-4 | 85/10/5 | 2.3 | ⊙ | ○ | 150 | ⊙ |
| 5 | E-1 P-2 G-1 | 70/20/10 | 1.1 | ⊙ | ⊙ | 105 | ⊙ |
| 6 | E-2 P-2 G-2 | 80/12.5/7.5 | 1.0 | ⊙ | ○ | 110 | ⊙ |
| 7 | E-3 P-1 G-2 | 75/15/10 | 1.6 | ○ | ○ | 145 | ⊙ |
| 8 | E-4 P-2 G-2 | 80/15/5 | 2.5 | ⊙ | ○ | 135 | ⊙ |
| 1 | E-1 P-1 | 74/26 | 1.0 | x | x | 35 | x |
| 2 | E-1 P-1 G-1 | 99.6/0.3/0.1 | 0.8 | x | x | 55 | ⊙ |
| 3 | " | 40/50/10 | 350 | ⊙ | ⊙ | 125 | Δ |
| 4 | " | 55/20/25 | 40 | ⊙ | ⊙ | 130 | Δ |
| 5 | " | 74/25.95/0.05 | 1.1 | x | x | 35 | x |
| 6 | E-1 P-1 | 70/25/5 | 1.2 | x | x | 30 | x |

TABLE 1-continued

| Example | Material | Blending ratio E/P/G | Oxygen permeability (cc · 20 μ/m² · day · atm) 25° C. × 75% RH | Stretch-ability 5 × 5  7 × 7 | Impact strength (kg · cm/mm) | Film thickness stability |
|---|---|---|---|---|---|---|
| | PO | | | | | |

In the above table, PO represents a medium-density polyethylene with a density of 0.955 g/cm³. In the above table, evaluation criteria are as follows: ⊚: Very Good ○: Good △: Fair x: Bad
(Determination of physical properties)
Oxygen permeability: Determined with a MOCON Oxtran 10/50.
Stretchability: Evaluated in terms of uneven stretching in concurrent biaxial stretching (5 × 5 times and 7 × 7 times) at 90° C.
Impact strength: Determined with a film impact tester, impact head diameter 3/2μ inch, 20° C. × 65% RH
Film thickness stability: Using a continuous film thickness gauge, the variation in film thickness in the direction of extrusion was measured and evaluated.

EXAMPLES 9 THROUGH 13

Outer layer (I): Nylon 6 [MFR: 4 g/10 min. (230° C., 2160 g)]

Intermediate layer (II): The composition of (A), (B) and (C) according to the invention Adhesive layer (III): Maleic anhydride-modified ethylene-vinyl acetate copolymer MFR: 2.5 g/10 min. (190° C. and 2160 g)]

Inner layer (IV): An ethylene-vinyl acetate(10%) copolymer MFR: 2 g/10 min. (190° C., 2160 g)]

Using the above resin materials, a four-layer laminate of the construction and film thicknesses (μ) (I)/(II)/(III)/(IV)=20/10/5/20 was fabricated under the following conditions. (In the stretching test, however, a sheet of 80/40/20/80 was used.)

| Molding conditions |
|---|
| Extrusion machines |
| 40 mm-dia. extruder (for inner layer) |
| 40 mm-dia. extruder (for intermediate layer) |
| 30 mm-dia. extruder (for adhesive layer) |
| 40 mm-dia. extruder (for outer layer) |
| Screw: all L/D = 28, compression ratio 3.2 |
| RPM of screw: |
| 40 rpm for inner layer |
| 20 rpm for intermediate layer |
| 20 rpm for adhesive layer |
| 40 rpm for outer layer |
| Die: |
| A T-die with a 4-layer combining adapter |
| Die width: 450 mm |
| Extrusion temperature: |
| Extruders for inner, outer and adhesive layers |
| $C_1 = 190°$ C. $C_2 = 200°$ C. |
| $C_3 = 210°$ C. $C_4 = 220°$ C. |
| Extruder for intermediate layer |

| Molding conditions |
|---|
| $C_1 = 180°$ C. $C_2 = 200°$ C. |
| $C_3 = 220°$ C. $C_4 = 220°$ C. |
| Combining adapter 210° C. |
| T-die 210° C. |

The results are set forth in Table 2.

TABLE 2

| Example | Material | Blending ratio E/P/G | Oxygen permeability (cc · 20 μ/m² · day · atm) 25° C. × 75% RH | Stretch-ability | Impact Strength (kg · cm/mm) | Interlayer bond strength (g/15 mm) |
|---|---|---|---|---|---|---|
| 9 | E-1 P-1 G-1 | 70/20/10 | 1.1 | ⊚ | 155 | 950 |
| 10 | E-2 P-2 G-2 | 80/12/3 | 1.0 | ⊚ | 130 | 830 |
| 11 | E-3 P-3 G-3 | 85/10/5 | 1.7 | ⊚ | 125 | 870 |
| 12 | E-4 P-1 G-4 | 70/25/5 | 2.8 | ⊚ | 145 | 800 |
| 13 | E-1 P-2 G-1 | 75/15/10 | 1.0 | ⊚ | 150 | 980 |

EXAMPLES 14 THROUGH 18

Inner layer (I) and outer layer (V): low-density polyethylene (MFR: 2.0 g/10 min.)

Adhesive layers (II) and (IV): Maleic anhydride-modified linear low-density polyethylene (MFR: 2 g/10 min.)

Intermediate layer (III): The composition of (A), (B) and (C) according to the invention Using the above resin materials, a five-layer laminate of the construction and film thickness (μ) (I)/(II)/(III)/(IV)/(V)=20/5/10/5/20 was fabricated under the following conditions. (In the stretching test, however, a film of 80/20/40/20/80 (μ) was used.)

| Extrusion machines: |
|---|
| 40 mm-dia. extruder (for inner and outer layers) |
| 40 mm-dia. extruder (for intermediate layer) |
| 30 mm-dia. extruder (for adhesive layers) |
| Screw: all L/D = 2.8, compression ratio 3.2 |
| RPM of screw: |
| 65 rpm for inner and outer layers |
| 20 rpm for intermediate layer |
| 30 rpm for adhesive layers |
| Die: |
| A T-die with a 5-layer combining adapter |
| Die width: 1200 mm |

-continued

Extrusion temperature:
Extruders for inner, outer and adhesive layers
$C_1 = 190°$ C. $C_2 = 200°$ C.
$C_3 = 210°$ C. $C_4 = 220°$ C.
Extruder for intermediate layer
$C_1 = 180°$ C. $C_2 = 200°$ C.
$C_3 = 220°$ C. $C_4 = 220°$ C.
Combining adapter 220° C.
T-die 210° C.

The results are set forth in Table 3.

EXAMPLES 19 THROUGH 26 AND CONTROL EXAMPLES 7 THROUGH 12

Using the following graft polymer, extrusion molding was conducted in the same manner as Examples 1 through 8 to produce a film.

The data on the film are presented in Table 4.

| Sample | Graft polymer | | | |
|---|---|---|---|---|
| | G-5 | G-6 | G-7 | G-8 |
| Trunk polymer (a) MFR (g/10 min.) | Linear low-density polyethylene (12.5) | Linear low-density polyethylene (7.8) | Ethylene-vinyl acetate(12%) copolymer (4.5) | Ethylene(12%)-propylene copolymer (8.0) |
| Unsaturated carboxylic acid (b) | Maleic anhydride | Maleic anhydride | Maleic anhydride | Maleic anhydride |
| Polyamide (c) | ε-Caprolactam type (P: 350) | ε-Caprolactam type (P: 400) | Hexamethylene-diamine/adipic acid type (P: 450) | ε-Caprolactam type (P: 450) |
| Composition ratio | | | | |
| (a)/(b) (weight ratio) | 100/2.1 | 100/2.5 | 100/1.8 | 100/2.9 |
| (c)/(b) (mole ratio) | 1/2 | 2/2.5 | 1.4/1.8 | 0.9/2.9 |

TABLE 3

| Example | Material | Blending ratio E/P/G | Physical properties | | | |
|---|---|---|---|---|---|---|
| | | | Oxygen permeability (cc · 20 μ/m² · day · atm) 25° C. × 75% RH | Stretch-ability | Impact Strength (kg · cm/mm) | Interlayer bond strength (g/15 mm) |
| 14 | E-1 P-1 G-1 | 72/20/5 | 1.9 | ⊙ | 95 | 950 |
| 15 | E-2 P-2 G-2 | 85/5/10 | 1.0 | ⊙ | 90 | 1050 |
| 16 | E-3 P-3 G-3 | 75/15/10 | 1.9 | ⊙ | 115 | 900 |
| 17 | E-4 P-1 G-4 | 70/20/10 | 2.9 | ⊙ | 100 | 930 |
| 18 | E-1 P-2 G-1 | 90/5/5 | 1.0 | ⊙ | 85 | 850 |

TABLE 4

| Example | Material | Blending ratio E/P/G | Physical properties | | | | |
|---|---|---|---|---|---|---|---|
| | | | Oxygen permeability (cc · 20 μ/m² · day · atm) 25° C. × 75% RH | Stretch-ability | | Impact strength (kg · cm/mm) | Film thickness stability |
| | | | | 5 × 5 | 7 × 7 | | |
| 19 | E-1 P-1 G-5 | 70/25/5 | 1.0 | ⊙ | ○ | 100 | ⊙ |
| 20 | E-2 P-2 G-6 | 75/15/10 | 1.3 | ⊙ | ⊙ | 105 | ⊙ |
| 21 | E-3 P-3 G-7 | 85/10/5 | 1.0 | ⊙ | ○ | 135 | ⊙ |
| 22 | E-4 P-1 G-8 | 85/10/5 | 2.5 | ⊙ | ○ | 160 | ⊙ |
| 23 | E-1 P-2 G-5 | 70/20/10 | 1.0 | ⊙ | ⊙ | 110 | ⊙ |

TABLE 4-continued

| Example | Material | Blending ratio E/P/G | Oxygen permeability (cc · 20 μ/m² · day · atm) 25° C. × 75% RH | Stretch-ability 5 × 5 | Stretch-ability 7 × 7 | Impact strength (kg · cm/mm) | Film thickness stability |
|---|---|---|---|---|---|---|---|
| 24 | E-2 P-2 G-6 | 80/12.5/7.5 | 1.4 | ⊚ | ○ | 120 | ⊚ |
| 25 | E-3 P-1 G-6 | 75/15/10 | 1.5 | ○ | ○ | 140 | ⊚ |
| 26 | E-4 P-2 G-5 | 80/15/5 | 2.8 | ⊚ | ○ | 125 | ⊚ |
| 7 | E-1 P-1 | 74/26 | 1.0 | x | x | 35 | x |
| 8 | E-1 P-1 G-5 | 99.6/0.3/0.1 | 0.9 | x | x | 60 | ⊚ |
| 9 | " | 40/50/10 | 410 | ⊚ | ⊚ | 130 | Δ |
| 10 | " | 55/20/25 | 45 | ⊚ | ⊚ | 135 | Δ |
| 11 | " | 74/25.95/0.05 | 1.0 | x | x | 40 | x |
| 12 | E-1 P-1 PO | 70/25/5 | 1.3 | x | x | 35 | x |

In the above table, PO represents a medium-density polyethylene with a density of 0.955 g/cm³.

EXAMPLES 27 THROUGH 31

A four-layer laminate was produced in the same manner as Examples 9 through 13. The results are set forth in Table 5.

EXAMPLES 32 THROUGH 36

A five-layer laminate was produced in the same manner as Examples 14 through 18. The results are set forth in Table 6.

TABLE 5

| Example | Material | Blending ratio E/P/G | Oxygen permeability (cc · 20 μ/m² · day · atm) 25° C. × 75% RH | Stretch-ability | Impact Strength (kg · cm/mm) | Interlayer bond strength (g/15 mm) |
|---|---|---|---|---|---|---|
| 27 | E-1 P-1 G-5 | 70/20/10 | 1.2 | ⊚ | 160 | 1000 |
| 28 | E-2 P-2 G-6 | 80/12/3 | 1.0 | ⊚ | 135 | 880 |
| 29 | E-3 P-3 G-7 | 85/10/5 | 1.9 | ⊚ | 135 | 840 |
| 30 | E-4 P-1 G-8 | 70/25/5 | 2.7 | ⊚ | 150 | 890 |
| 31 | E-1 P-2 G-5 | 75/15/10 | 1.1 | ⊚ | 170 | 950 |

TABLE 6

| Example | Material | Blending ratio E/P/G | Oxygen permeability (cc · 20 μ/m² · day · atm) 25° C. × 75% RH | Stretch-ability | Impact Strength (kg · cm/mm) | Interlayer bond strength (g/15 mm) |
|---|---|---|---|---|---|---|
| 32 | E-1 P-1 G-5 | 72/20/5 | 1.9 | ⊚ | 110 | 1080 |
| 33 | E-2 P-2 G-6 | 85/5/10 | 1.3 | ⊚ | 95 | 1020 |
| 34 | E-3 P-3 G-7 | 75/15/10 | 2.1 | ⊚ | 105 | 950 |
| 35 | E-4 P-1 G-8 | 70/20/10 | 3.2 | ⊚ | 115 | 990 |
| 36 | E-1 P-2 G-5 | 90/5/5 | 1.1 | ⊚ | 90 | 830 |

What is claimed is:

1. An improved saponified ethylene-vinyl acetate copolymer-containing composition comprising
   (A) 50 to 99.5 weight % of a saponified ethylene-vinyl acetate copolymer, with an ethylene content of 20 to 60 mole % and a degree of saponification of its vinyl acetate component being not less than 95 mole %,
   (B) 0.4 to 49.9 weight % of an ethylene copolymer different from copolymer (A) and which has a density of 0.90–0.94 g/cm$^3$, and
   (C) 0.1 to 15 weight % of a graft polymer obtained by grafting 0.05 to 10 parts by weight of an ethylenically unsaturated carboxylic acid or a derivative thereof to 100 parts by weight of a polyolefin resin to produce an adduct and reacting the adduct with a polyamide having a degree of polymerization of 350 to 500 where the reaction ratio of the polyamide to the adduct is 0.01 to 1 mole per mole of carboxyl group of the adduct.

2. A shaped article obtained by melt-molding a composition claimed in claim 1.

3. A shaped article according to claim 2 which is at least uniaxially oriented.

* * * * *